(12) United States Patent
Tinsley

(10) Patent No.: US 11,826,667 B1
(45) Date of Patent: Nov. 28, 2023

(54) ROLLER COASTER WITH SEPARABLE CARS AND PATHS

(71) Applicant: Erick Tinsley, Bloomfield Hills, MI (US)

(72) Inventor: Erick Tinsley, Bloomfield Hills, MI (US)

(*) Notice: Subject to any disclaimer, the term of this patent is extended or adjusted under 35 U.S.C. 154(b) by 340 days.

(21) Appl. No.: 17/316,815

(22) Filed: May 11, 2021

(51) Int. Cl.
| | |
|---|---|
| A63G 7/00 | (2006.01) |
| B61B 13/00 | (2006.01) |
| B61G 5/02 | (2006.01) |
| B60B 17/00 | (2006.01) |
| E01B 7/00 | (2006.01) |

(52) U.S. Cl.
CPC ............ *A63G 7/00* (2013.01); *B60B 17/0006* (2013.01); *B61B 13/00* (2013.01); *B61G 5/02* (2013.01); *E01B 7/00* (2013.01); *B60Y 2200/37* (2013.01)

(58) Field of Classification Search
CPC .......... B61B 13/00; A63G 7/00; A63G 31/00; B60B 17/0006; B61G 5/00; B61G 5/02; E01B 7/00; E01B 7/02; E01B 7/04; B60Y 2200/37
See application file for complete search history.

(56) References Cited

U.S. PATENT DOCUMENTS

| | | | | |
|---|---|---|---|---|
| 1,480,678 | A * | 1/1924 | Feucht | B61G 5/02 |
| | | | | 213/46 R |
| 3,889,605 | A * | 6/1975 | Bacon | A63G 7/00 |
| | | | | 104/246 |
| 3,931,767 | A * | 1/1976 | Karch | B61B 13/08 |
| | | | | 104/130.02 |
| D317,642 | S | 6/1991 | Hashimoto | |
| 5,193,462 | A | 3/1993 | Marcu | |
| 6,170,402 | B1 * | 1/2001 | Rude | A63G 7/00 |
| | | | | 701/19 |
| 8,141,495 | B2 | 3/2012 | Baker | |
| 8,485,104 | B2 | 7/2013 | Nemeth | |
| 8,893,623 | B2 * | 11/2014 | Gordon | A63G 7/00 |
| | | | | 104/53 |
| 10,556,186 | B2 * | 2/2020 | Rebbie | B61D 15/00 |
| 10,579,073 | B2 * | 3/2020 | Dembinski | A63G 25/00 |
| 10,835,833 | B2 * | 11/2020 | Grogan | A63G 21/14 |
| 2020/0095072 | A1 * | 3/2020 | Davidson | B60L 13/03 |

* cited by examiner

*Primary Examiner* — S. Joseph Morano
*Assistant Examiner* — Cheng Lin (57) ABSTRACT

The roller coaster with separable cars and multiple paths is a mechanical structure. The roller coaster with separable cars and multiple paths incorporates a plurality of trolleys, a track structure, and a control structure. The control structure controls the motion of the plurality of trolleys through the track structure. Each individual trolley selected from the plurality of trolleys travels along the track structure either as a train or as in individual trolley. Each individual trolley can both separate from the train and rejoin the train as the individual trolley travels through the track structure. The track structure is a multipath structure. The track structure forms a circuit. The track structure forms the path that guides each the plurality of trolleys through the circuit formed by the track structure. Each individual trolley can take an individual path selected from the multipath structure of the track structure.

18 Claims, 6 Drawing Sheets

ROLLER COASTER WITH SEPARABLE CARS AND PATHS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of games and amusements, more specifically, an up and down hill track with switchbacks. (A63G7/00)

SUMMARY OF INVENTION

The roller coaster with separable cars and multiple paths is a mechanical structure. The roller coaster with separable cars and multiple paths comprises a plurality of trolleys, a track structure, and a control structure. The control structure controls the motion of the plurality of trolleys through the track structure.

The plurality of trolleys comprises a collection of individual trolleys. Each individual trolley travels along the track structure in a configuration selected from the group consisting of: a) independently traveling along a path formed within the track structure as a single individual trolley; b) traveling along the track structure while joined to a second individual trolley selected from the plurality of trolleys; and, b) traveling along the track structure while joined to a second individual trolley and a third individual trolley both of which are selected from the plurality of trolleys. In this disclosure, two or more independent trolleys traveling together while joined together are referred to as a train.

The track structure is a multipath structure. The track structure forms a circuit. The track structure forms the path that guides the plurality of trolleys through the circuit formed by the track structure. The plurality of trolleys are joined into one or more trains as the plurality of trolleys travel through the track structure. Each individual trolley is separated from the train as the individual trolley travels through the track structure such that each individual trolley can take an individual path selected from the multipath structure of the track structure.

These together with additional objects, features and advantages of the roller coaster with separable cars and multiple paths will be readily apparent to those of ordinary skill in the art upon reading the following detailed description of the presently preferred, but nonetheless illustrative, embodiments when taken in conjunction with the accompanying drawings.

In this respect, before explaining the current embodiments of the roller coaster with separable cars and multiple paths in detail, it is to be understood that the roller coaster with separable cars and multiple paths is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the roller coaster with separable cars and multiple paths.

It is therefore important that the claims be regarded as including such equivalent construction insofar as they do not depart from the spirit and scope of the roller coaster with separable cars and multiple paths. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

The roller coaster with separable cars and multiple paths is a mechanical structure. The roller coaster with separable cars and multiple paths comprises a plurality of trolleys, a track structure, and a control structure. The control structure controls the motion of the plurality of trolleys through the track structure.

The plurality of trolleys comprises a collection of individual trolleys. Each individual trolley travels along the track structure in a configuration selected from the group consisting of: a) independently traveling along a path formed within the track structure as a single individual trolley; b) traveling along the track structure while joined to a second individual trolley selected from the plurality of trolleys; and, b) traveling along the track structure while joined to a second individual trolley and a third individual trolley both of which are selected from the plurality of trolleys. In this disclosure, two or more independent trolleys traveling together while joined together are referred to as a train.

The track structure is a multipath structure. The track structure forms a circuit. The track structure forms the path that guides the plurality of trolleys through the circuit formed by the track structure. The plurality of trolleys are joined into one or more trains as the plurality of trolleys travel through the track structure. Each individual trolley is separated from the train as the individual trolley travels through the track structure such that each individual trolley can take an individual path selected from the multipath structure of the track structure.

SPECIFICATION

Figure 1:
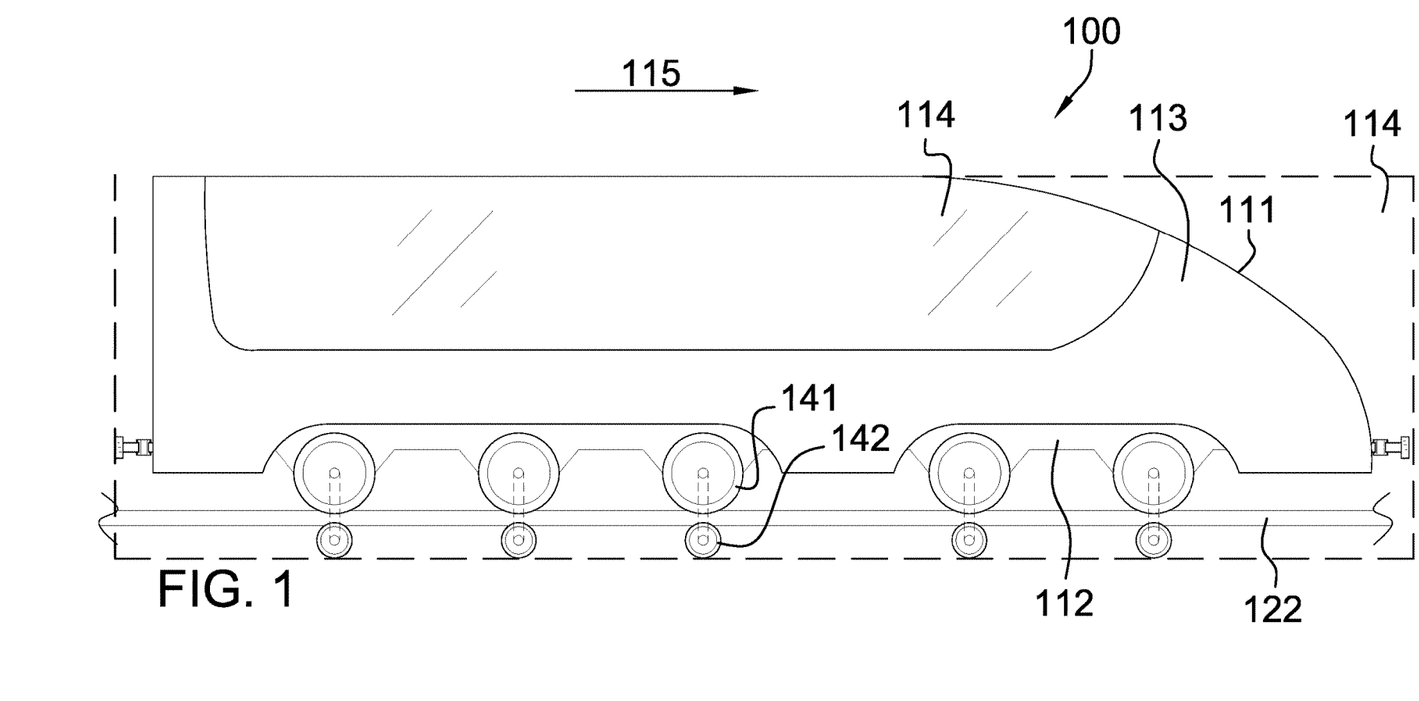
FIG. 1 is a side view of an embodiment of the disclosure.
Figure 2:
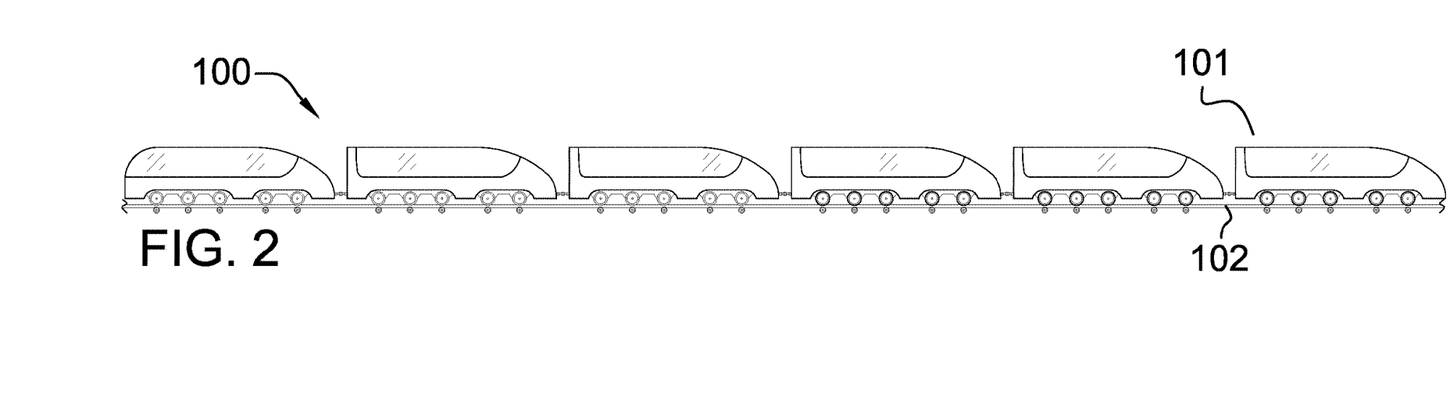
FIG. 2 is a side view of an embodiment of the disclosure.
Figure 3:
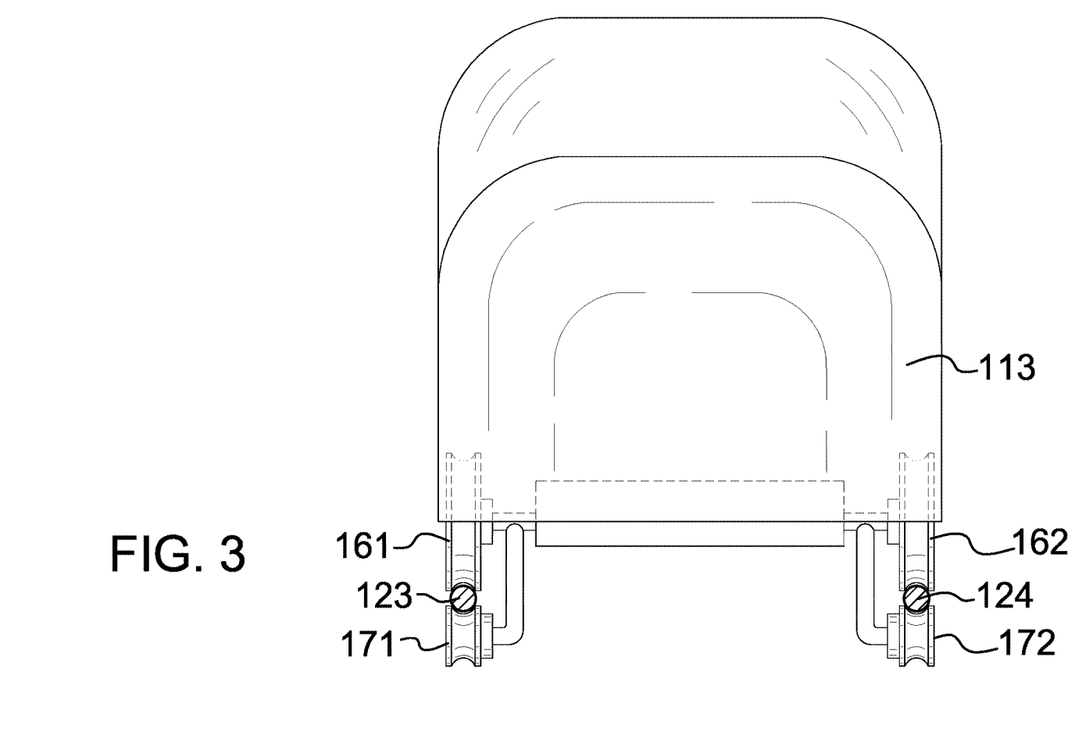
FIG. 3 is a posterior view of an embodiment of the disclosure.
Figure 4:
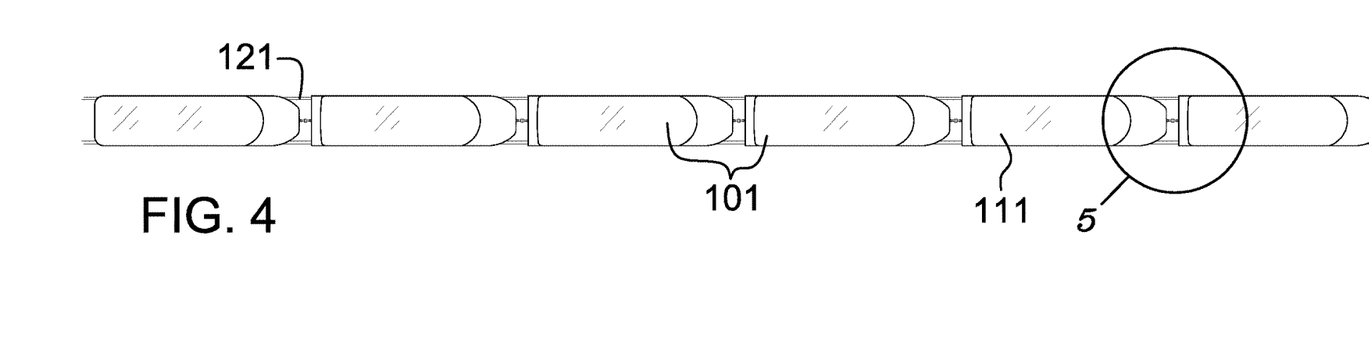
FIG. 4 is a top view of an embodiment of the disclosure.
Figure 5:
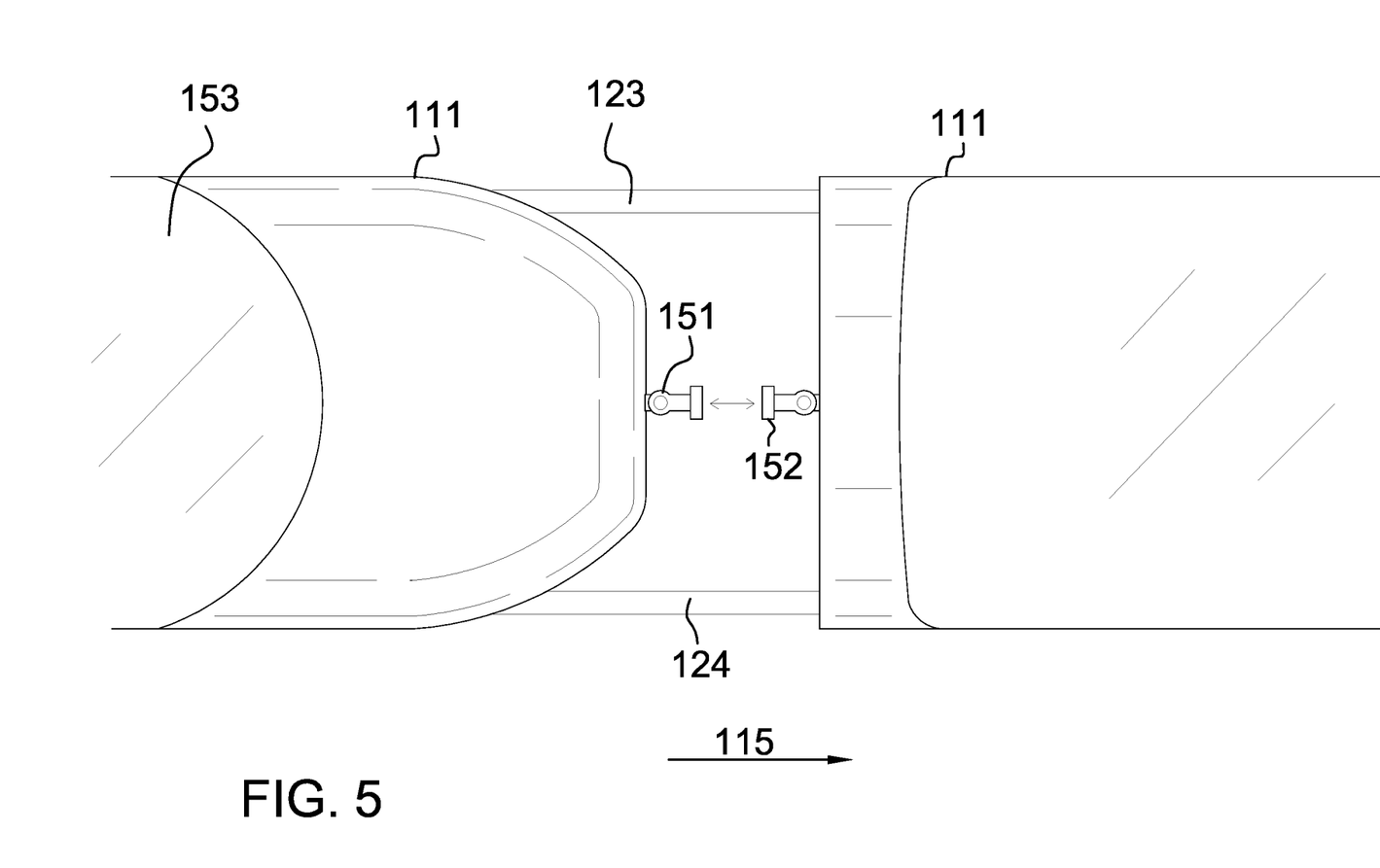
FIG. 5 is a detail view of an embodiment of the disclosure.
Figure 6:
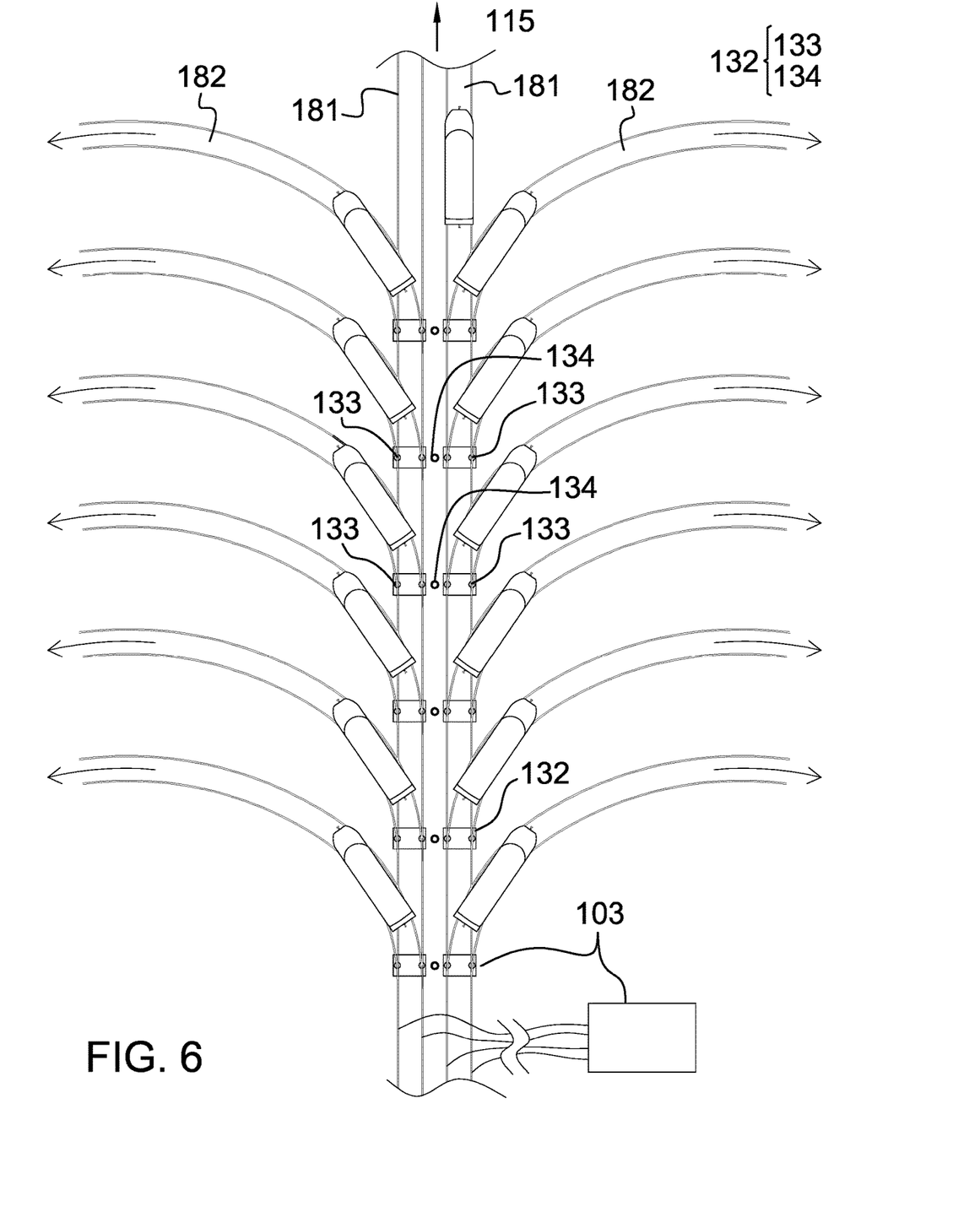
FIG. 6 is an in-use view of an embodiment of the disclosure.
Figure 7:
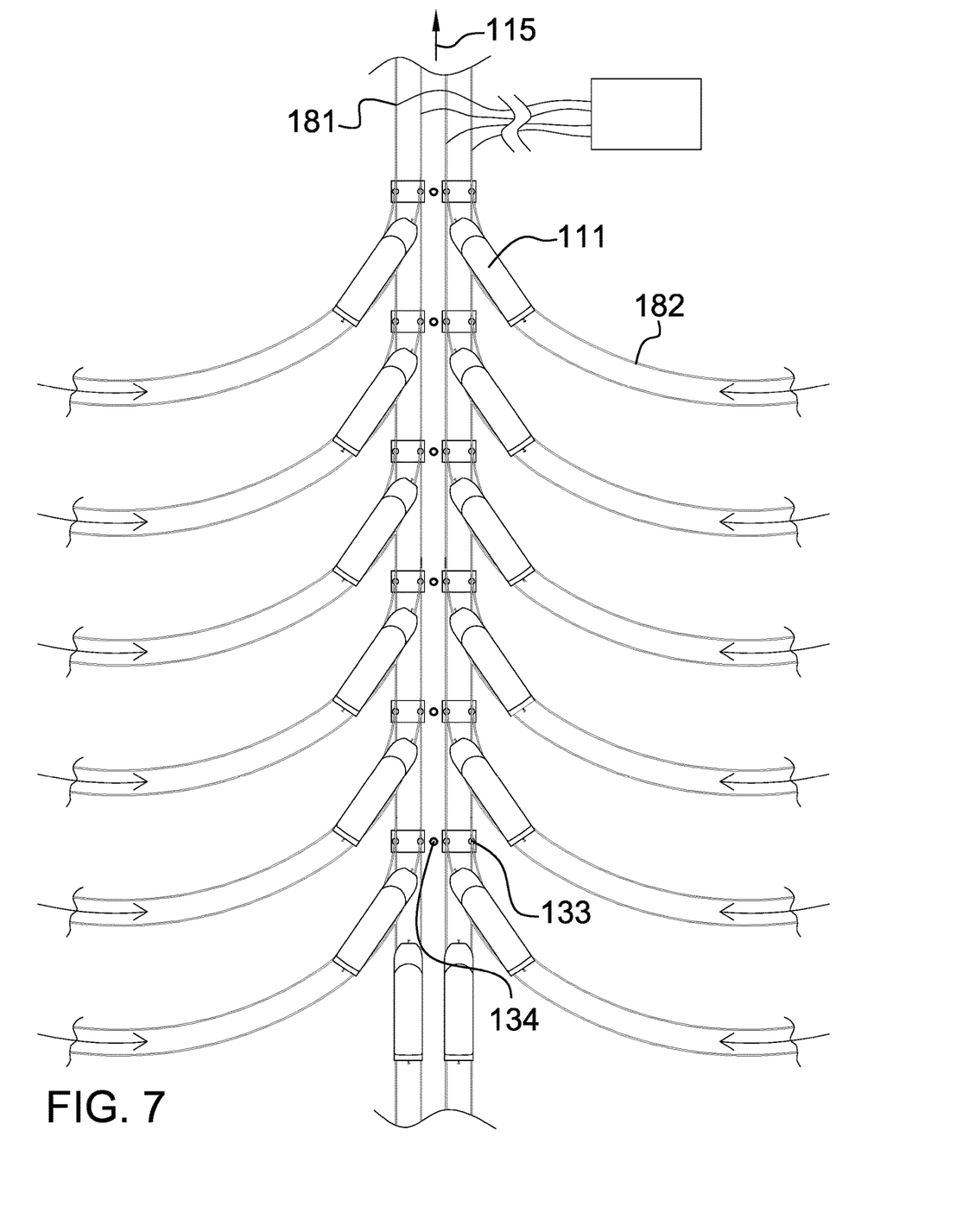
FIG. 7 is an in-use view of an embodiment of the disclosure.
Figure 8:
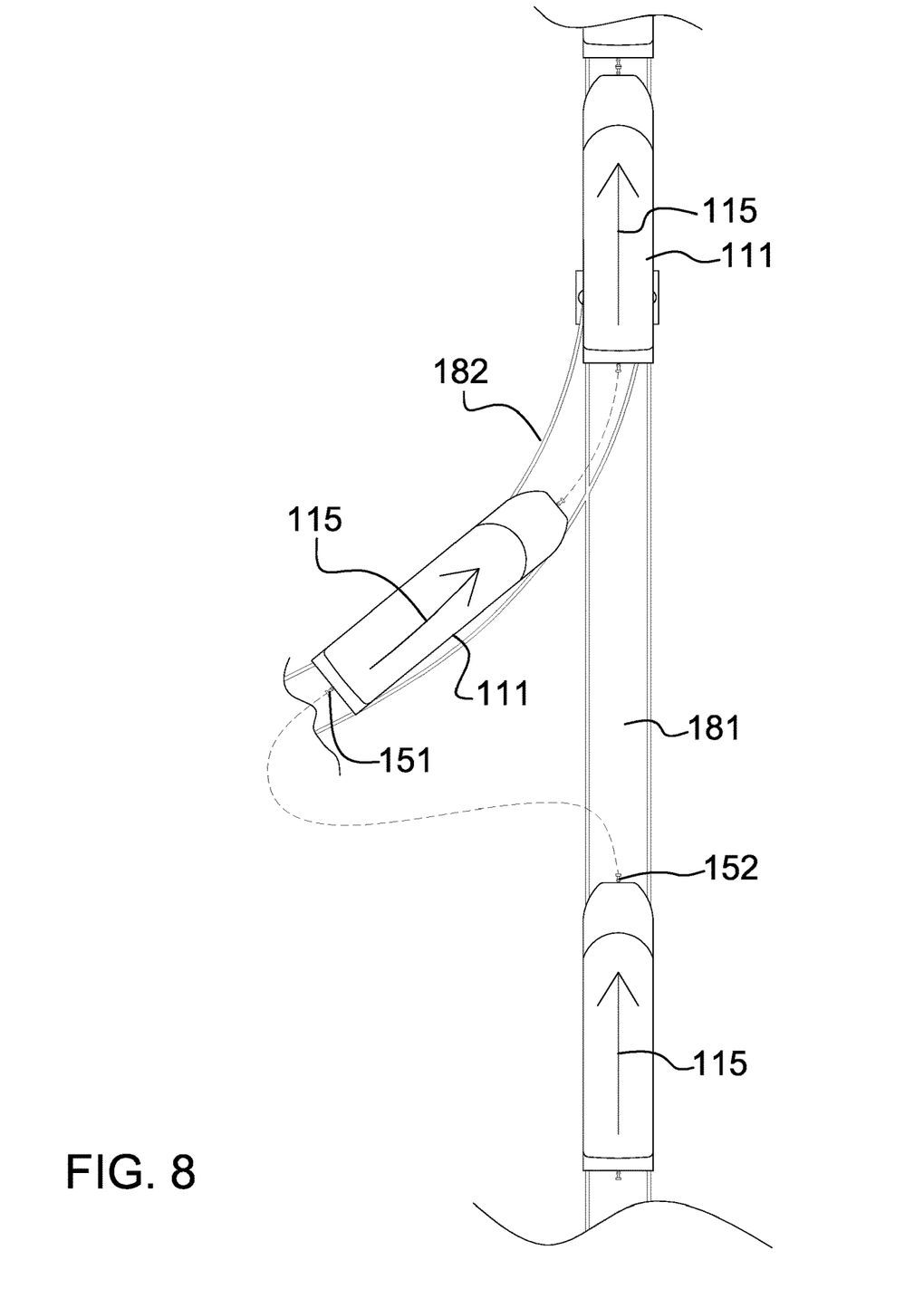
FIG. 8 is an in-use view of an embodiment of the disclosure.

Detailed reference will now be made to one or more potential embodiments of the disclosure, which are illustrated in FIGS. 1 through 8.

The roller coaster with separable cars and multiple paths 100 (hereinafter invention) is a mechanical structure. The invention 100 comprises a plurality of trolleys 101, a track structure 102, and a control structure 103. The control structure 103 controls the motion of the plurality of trolleys 101 through the track structure 102.

The plurality of trolleys 101 comprises a collection of individual trolleys 111. Each individual trolley 111 travels along the track structure 102 in a configuration selected from the group consisting of: a) independently traveling along a path formed within the track structure 102 as a single individual trolley 111; b) traveling along the track structure 102 while joined to a second individual trolley 111 selected from the plurality of trolleys 101; and, c) traveling along the track structure 102 while joined to a second individual trolley 111 and a third individual trolley 111 both of which are selected from the plurality of trolleys 101. In this disclosure, two or more independent trolleys traveling together while joined together are referred to as a train.

The track structure 102 is a multipath structure. The track structure 102 forms a circuit. The track structure 102 forms the path that guides the plurality of trolleys 101 through the circuit formed by the track structure 102. The plurality of trolleys 101 are joined into one or more trains as the plurality of trolleys 101 travel through the track structure 102. Each individual trolley 111 is separated from the train as the individual trolley 111 travels through the track structure 102 such that each individual trolley 111 can take an individual track path 122 selected from the multipath structure of the track structure 102.

The track structure 102 is a mechanical structure. The track structure 102 forms a circuit over which the plurality of trolleys 101 travel. The track structure 102 is a multipath structure. By a multipath structure is meant that the track structure 102 presents a plurality of routes over which each individual trolley 111 selected from the plurality of trolleys 101 can travel. The plurality of track paths 121 comprises a collection of individual track paths 122.

Each of the plurality of track paths 121 forms the physical structure that creates the circuit and the associated routes formed by the track structure 102. Each individual trolley 111 attaches to the track structure 102 such that the individual trolley 111 can travel along each individual track path 122 selected from the plurality of track paths 121. The plurality of track paths 121 are arranged to form the circuit of the track structure 102. The plurality of track paths 121 present a plurality of routes that are used by the plurality of trolleys 101 to travel around the circuit formed by the track structure 102.

Each individual track path 122 selected from the plurality of track paths 121 is selected from the group consisting of: a) a primary track path 181; and, b) a peripheral track path 182. The primary track path 181 refers to the elements of the plurality of track paths 121 that form the base circuit structure of the track structure 102. The peripheral track path 182 refers to one or more alternate paths that are formed around the primary track path 181. Each of the peripheral track path 182 forms a path with a starting point that branches off from the primary track path 181 and a destination point that rejoins the primary track path 181. The peripheral track paths 182 are separated from each other at a distance greater than twice the perimetrical boundary 114 of any individual trolley 111 to form clearances that ensure that the individual trolleys 111 will not collide with each other.

Each individual track path 122 describes a specific route that can be used by any individual trolley 111 selected from the plurality of trolleys 101 to travel around the circuit formed by the track structure 102. The individual track paths 122 are interconnected to form the physical structures that create the circuit and the associated routes formed by the track structure 102. Each individual track path 122 comprises a port rail 123 and a starboard rail 124.

The port rail 123 is a rail. The rail is defined elsewhere in this disclosure. The port rail 123 forms a rigid structure that secures the individual trolley 111 to the individual track path 122. The port rail 123 forms the physical structure that guides the motion of the individual trolley 111 through the track structure 102.

The starboard rail 124 is a rail. The rail is defined elsewhere in this disclosure. The starboard rail 124 forms a rigid structure that secures the individual trolley 111 to the individual track path 122. The starboard rail 124 forms the physical structure that guides the motion of the individual trolley 111 through the track structure 102.

Each of the plurality of trolleys 101 is a vehicle. Each of the plurality of trolleys 101 attaches to the track structure 102 such that the track structure 102 guides the motion of each individual trolley 111 along the path formed by the track structure 102. Each of the plurality of trolleys 101 carries one or more passengers along the path formed by the track structure 102. Each of the plurality of trolleys 101 travels along the path formed by the track structure 102 in a manner selected from the group consisting of: a) traveling as a single individual trolley 111; and, b) traveling as part of a train of individual trolleys 111.

Each of the plurality of trolleys 101 attaches to and detaches from the train as the individual trolley 111 travels along the path formed by the track structure 102. The control structure 103 controls the specific individual track path 122 along which the individual trolley 111 travels. The specific individual track path 122 selected from the plurality of track paths 121 followed by each individual trolley 111 selected from the plurality of trolleys 101 determines when each individual trolley 111 attaches to and detaches from a train.

The plurality of trolleys 101 comprises a collection of individual trolleys 111. Each individual trolley 111 is identical. The individual trolley 111 is a vehicle. Each individual trolley 111 selected from the plurality of trolleys 101 is identical. The individual trolley 111 attaches to the track structure 102 such that the individual trolley 111 travels along a path formed by the track structure 102. The control structure 103 determines the route of the path followed by the individual trolley 111. Each individual trolley 111 selected from the plurality of trolleys 101 comprises a chassis 112, a passenger compartment 113, a perimetrical boundary 114, and a primary sense of direction 115.

The perimetrical boundary 114 describes a hypothetical boundary that fully contains the physical structure of the individual trolley 111. The perimetrical boundary 114 is defined elsewhere in this disclosure. The primary sense of direction 115 is the intended direction of forward travel for each individual trolley 111 selected from the plurality of trolleys 101. The primary sense of direction 115 is defined elsewhere in this disclosure.

The chassis 112 is a mechanical structure that attaches the individual trolley 111 to the track structure 102. The chassis 112 is a rolling structure that allows the individual trolley 111 to roll along each individual track path 122 selected from the plurality of track paths 121. The chassis 112 further comprises a plurality of coaster wheels 141 and a plurality of retaining wheels 142.

Each of the plurality of coaster wheels 141 is a rotating structure known as a wheel. Each of the plurality of coaster wheels 141 allows the individual trolley 111 to travel along a path formed by the track structure 102. Each of the plurality of coaster wheels 141 is a load bearing structure that transfers the bulk of the load of the individual trolley 111 to the track structure 102. Each of the plurality of coaster wheels 141 transfers the load of the individual trolley 111 to a rail of an individual track path 122 selected from the group consisting of the port rail 123 and the starboard rail 124. The plurality of coaster wheels 141 comprises a plurality of port coaster wheels 161 and a plurality of starboard coaster wheels 162.

The plurality of port coaster wheels 161 are the subset of coaster wheels selected from the plurality of coaster wheels 141 that secure the individual trolley 111 to the port rail 123 of the individual track path 122. The plurality of starboard coaster wheels 162 are the subset of coaster wheels selected from the plurality of coaster wheels 141 that secure the individual trolley 111 to the starboard rail 124 of the individual track path 122.

Each of the plurality of retaining wheels 142 is a rotating structure known as a wheel. The primary function of each of the plurality of retaining wheels 142 is to secure the individual trolley 111 to the track structure 102. Each of the plurality of retaining wheels 142 secures the individual trolley 111 to a rail of an individual track path 122 selected from the group consisting of the port rail 123 and the starboard rail 124. Each of the plurality of retaining wheels 142 are positioned such that the plurality of retaining wheels 142 are diametrically opposed to the plurality of coaster wheels 141 relative to the selected rail. The plurality of retaining wheels 142 and the plurality of coaster wheels 141 are formed such that the plurality of retaining wheels 142 and the plurality of coaster wheels 141 combine to enclose the selected rail. The plurality of retaining wheels 142 comprises a plurality of port retaining wheels 171 and a plurality of starboard retaining wheels 172.

The plurality of port retaining wheels 171 are the subset of retaining wheels selected from the plurality of retaining wheels 142 that secure the individual trolley 111 to the port rail 123 of the individual track path 122. The plurality of starboard retaining wheels 172 are the subset of retaining wheels selected from the plurality of retaining wheels 142 that secure the individual trolley 111 to the starboard rail 124 of the individual track path 122.

The passenger compartment 113 is a mechanical structure. The passenger compartment 113 forms a protected space for the one or more passengers transported in the passenger compartment 113. The passenger compartment 113 mounts on the chassis 112 such that the position of the chassis 112 is between the passenger compartment 113 and the track structure 102. The passenger compartment 113 further comprises a bow electromagnet 151, a stern electromagnet 152, and a canopy 153.

The bow electromagnet 151 is an electrically powered magnet. The bow electromagnet 151 attaches to the bow structure of the passenger compartment 113 of the individual trolley 111. The stern electromagnet 152 is an electrically powered magnet. The stern electromagnet 152 attaches to the stern structure of the passenger compartment 113 of the individual trolley 111. The polarity of the stern electromagnet 152 is reversed relative to the polarity of the bow electromagnet 151. By reversing the polarity is meant that the bow electromagnet 151 of any first individual trolley 111 traveling along the track structure 102 will be magnetically attracted to the stern electromagnet 152 of any second individual trolley 111 traveling track structure 102.

The bow electromagnet 151 of a first individual trolley 111 magnetically attaches to the stern electromagnet 152 of a second individual trolley 111 to form a train. The control structure 103 controls the operation of both the bow electromagnet 151 and the stern electromagnet 152 to couple individual trolleys 111 into trains and to decouple trains into individual trolleys 111.

The canopy 153 is a transparent structure that encloses the protected space formed by the passenger compartment 113. The canopy 153 is a transparent structure that allows the passengers to see outside of the passenger compartment 113.

The control structure 103 is a mechanical structure. The control structure 103 controls the path along which each individual trolley 111 selected from the plurality of trolleys 101 travels. The control structure 103 enables each individual trolley 111 selected from the plurality of trolleys 101 such that the selected individual trolley 111 can join a train. The control structure 103 enables each individual trolley 111 selected from the plurality of trolleys 101 such that the selected individual trolley 111 can detach from a train. The control structure comprises a plurality of track switch structures 131.

Each of the plurality of track switch structures 131 is a mechanical device. Each of the plurality of track switch structures 131 attaches a first individual track path 122 selected from the plurality of track paths 121 to a second individual track path 122 selected from the plurality of track paths 121 to form a continuous track path along which the individual trolley 111 travels. Each of the plurality of track switch structures 131 further attaches the first individual track path 122 to a third individual track path 122 selected from the plurality of track paths 121 to form an alternate route along which the individual trolley 111 travels. The plurality of track switch structures 131 determines which specific route each individual trolley 111 takes as the individual trolley 111 travels over the track structure 102. The plurality of track switch structures 131 comprises a collection of individual track switch controllers 132. Each individual track switch controller 132 is identical.

The individual track switch controller 132 is the mechanical structure that attaches the first individual track path 122 to both the second and third individual track paths 122. The individual track switch controller 132 is a mechanical structure, often called a switch, that selects the path of each individual trolley 111. By determining the path of the individual trolley 111 is meant that the position of the mechanical structure of the individual track switch controller 132 determines whether: a) the individual trolley 111 travels from the first individual track path 122 to the second individual track path 122; or, b) the individual trolley 111 travels from the first individual track path 122 to the third individual track path 122.

Because of the circuit structure of the track structure 102, it will generally be the case that the first individual track path 122 associated with any first individual track switch controller 132 selected from the track switch structures 131 will form a second or a third individual track path 122 that is associated with a second individual track switch controller 132 selected from the track switch structures 131.

Each individual track switch controller 132 selected from the track switch structures 131 comprises an individual path switch 133 and an individual electromagnet control switch 134.

The individual path switch 133 is the mechanical structure that joins the first individual trolley 111 to both the second and third individual track paths 122. The individual path switch 133 selects the path taken by each individual trolley 111 as the individual trolley 111 travel across the individual path switch 133. By selecting the path is meant that the individual path switch 133 selects the routing of each individual trolley 111 from a course selected from the group consisting of: a) the individual trolley 111 traveling from the first individual track path 122 to the second individual track path 122; and, b) the individual trolley 111 traveling from the first individual track path 122 to the third individual track path 122.

The individual electromagnet control switch 134 is a device that performs an operation selected from the group consisting of: a) enabling any first individual trolley 111 such that the first individual trolley 111 can join a second individual trolley 111 to form a train; and, b) enabling any first individual trolley 111. individual trolley 111 such that the first individual trolley 111 can detach from a train and travel independently over the track structure 102. The individual electromagnet control switch 134 allows for the joining of individual track paths 122 into trains by enabling the simultaneous operation of both bow electromagnet 151 and the stern electromagnet 152 of the passenger compartment 113 of the individual trolley 111.

The following definitions were used in this disclosure:

Aft: As used in this disclosure, aft is a term that relates a first object to a second object. When the second object is closer to the stern of a vehicle, the second object is said to be aft of the first object. The term is commonly used on vessels and vehicles.

Anterior: As used in this disclosure, anterior is a term that is used to refer to the front side or direction of a structure. When comparing two objects, the anterior object is the object that is closer to the front of the structure.

Bow: As used in this disclosure, the bow refers to the anterior side of an object, vehicle, or vessel. Specifically, the bow refers to the most forward element of the object in the direction of the primary sense of direction of the object vehicle, or vessel.

Canopy: As used in this disclosure, a canopy is a cover that is placed above a space to create a protected space.

Chassis: As used in this disclosure, a chassis is a wheeled structure that is used to transport an attached load.

Circuit: As used in this disclosure, a circuit refers to a path or a route that forms a loop-like structure such that the starting point and the destination point are the same point.

Course: As used in this disclosure, a course refers to the direction, and changes to the direction that are required to travel from a starting point to a destination point.

Diameter: As used in this disclosure, a diameter of an object is a straight line segment (or a radial line) that passes through the center (or center axis) of an object. The line segment of the diameter is terminated at the perimeter or boundary of the object through which the line segment of the diameter runs. A radius refers to the line segment that overlays a diameter with one termination at the center of the object. A span of a radius is always one half the span of the diameter.

Diametrically Opposed: As used in this disclosure, diametrically opposed is a term that describes the locations of a first object and a second object located at opposite ends of a diameter drawn through a third object. The term diametric opposition can also be used to describe this relationship.

Electromagnet: As used in this disclosure, an electromagnet is a core formed from a magnetic material that has a coil formed from an electric current carrying conductor wrapped around it. When an electric current flows through the coil, the core exhibits magnetic properties when an electric current flows through the coil and exhibits no (or reduced) magnetic properties when electric current is not flowing through the coil.

Force of Gravity: As used in this disclosure, the force of gravity refers to a vector that indicates the direction of the pull of gravity on an object at or near the surface of the earth.

Forward: As used in this disclosure, forward is a term that relates a first object to a second object. When the first object is closer to the bow of a vehicle, the first object is said to be forward of the second object. The term is commonly used on vessels and vehicles. See bow, aft, port, starboard, and stern Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Lateral: As used in this disclosure, the term lateral refers to the movement of an object that is perpendicular to the primary sense of direction of an object and parallel to the horizontal plane (or perpendicular to the vertical plane). Lateral movement is always perpendicular to the anterior posterior axis. Lateral movement is often called sideways movement.

Magnet: As used in this disclosure, a magnet is an ore, alloy, or other material that has its component atoms arranged so the material exhibits properties of magnetism such as: 1) attracting other iron-containing objects; 2) attracting other magnets; or, 3) or aligning itself in an external magnetic field. A magnet is further defined with a north pole and a south pole. By aligning with an external magnetic field is meant that the north-south pole structure of a first magnet will align with the north south pole of a second magnet. The pole of any first magnet will attract the opposite pole of any second magnet (i.e. a north pole will attract a south pole).

Multipath Structure: As used in this disclosure, a multipath structure refers to a plurality of path structures that offer a plurality of different routes sharing the same starting point and the same ending point.

Path: As used in this structure, a path is a marked or identified route along which an individual or object can travel from a starting point to an ending point. A path is often formed as a track, a road or a trail.

Perimetrical Boundary: As used in this disclosure, a perimetrical boundary is a hypothetical rectangular block that contains an object. Specifically, the rectangular block selected to be the perimetrical boundary is the rectangular block with the minimum volume that fully contains the object. In a two-dimensional structure, the perimetrical boundary is the rectangle with the minimum surface area.

Port: As used in this disclosure, port refers to the left side of a vehicle when a viewer is facing towards the primary sense of direction of the vehicle.

Posterior: As used in this disclosure, posterior is a term that is used to refer to the side of an object that is distal or in the opposite direction of the anterior side. When comparing two items, the posterior item is the item that is distal from the anterior of the object.

Primary Sense of Direction: As used in this disclosure, the primary sense of direction of an object refers to a vector that: 1) passes through the center of the object; and, 2) is parallel to the direction of travel when the anterior surface(s) of the object are leading the object into the direction of travel. This definition intends to align with what people would normally call the forward direction of an object.

Protected Space: As used in this disclosure, a protected space is a negative space within which an object is stored. The protected space is enclosed by a boundary structure, often referred to as a guard, that prevents impacts from damaging the object contained within the protected space.

Radial: As used in this disclosure, the term radial refers to a direction that: 1) is perpendicular to an identified central axis; or, 2) projects away from a center point.

Rail: As used in this disclosure, a rail is a continuous structure that forms a path that is used to guide the motion of an object.

Rectangular Block: As used in this disclosure, a rectangular block refers to a three-dimensional prism structure comprising six rectangular surfaces (commonly called faces) formed at right angles. Within this disclosure, a rectangular block may further comprise rounded edges and corners.

Rigid Structure: As used in this disclosure, a rigid structure is a solid structure formed from an inelastic material that resists changes in shape. A rigid structure will permanently deform as it fails under a force. See bimodal flexible structure.

Rounded: A used in this disclosure, the term rounded refers to the replacement of an apex, vertex, or edge or brink of a structure with a (generally smooth) curvature wherein the concave portion of the curvature faces the interior or center of the structure.

Route: As used in this disclosure, a route refers to the course that is taken to travel from a starting point to a destination point.

Starboard: As used in this disclosure, starboard refers to the right side of a vehicle when a viewer is facing towards the primary sense of direction of the vehicle.

Stern: As used in this disclosure, the stern refers to the posterior side of an object, vehicle, or vessel. The stern is distal from the bow along the primary sense of direction.

Superior: As used in this disclosure, the term superior refers to a directional reference that is parallel to and in the opposite direction of the force of gravity when an object is positioned or used normally.

Track: As used in this disclosure, a track is a physical structural relationship between a first object and a second object that serves a purpose selected from the group consisting of: 1) fastening the second object to the first object; 2) controlling the path of motion of the first object relative to the second object; or, 3) a combination of the first two elements of this group.

Transparent: As used in this disclosure, transparent refers to a material that allows light to pass through the material without significant scattering such that an object can be clearly seen through the material.

Trolley: As used in this disclosure, a trolley is a mechanical structure that attaches an object to a jib or a track such that the position of the object relative to the jib or track is adjustable.

Vehicle: As used in this disclosure, a vehicle is a device that is used for transporting passengers, goods, or equipment. The term motorized vehicle refers to a vehicle can move under power provided by an electric motor or an internal combustion engine.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 8 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A multipath roller coaster with separable cars comprising a plurality of trolleys, a track structure, and a control structure;

wherein the control structure controls the motion of the plurality of trolleys through the track structure;

wherein the plurality of trolleys comprises a collection of individual trolleys;

wherein each individual trolley travels along the track structure in a configuration selected from the group consisting of: a) independently traveling along a path formed within the track structure as a single individual trolley; b) traveling along the track structure while joined to a second individual trolley selected from the plurality of trolleys; and, c) traveling along the track structure while joined to a second individual trolley and a third individual trolley both of which are selected from the plurality of trolleys;

wherein the plurality of track switch structures comprises a collection of individual track switch controllers;

wherein each of the plurality of track switch structures attaches a first individual track path selected from the plurality of track paths to a second individual track path selected from the plurality of track paths to form a continuous track path along which the individual trolley travels;

wherein each of the plurality of track switch structures further attaches the first individual track path to a third individual track path selected from the plurality of track paths to form an alternate route along which the individual trolley travels;

wherein each individual track switch controller selected from the track switch structures comprises an individual path switch and an individual electromagnet control switch;

wherein the individual path switch is the mechanical structure that joins the first individual trolley to both the second and third individual track paths;

wherein the individual electromagnet control switch is a device that performs an operation selected from the group consisting of: a) enabling any first individual trolley such that the first individual trolley can join a second individual trolley to form a train; and, b) enabling any first individual trolley.

2. The multipath roller coaster with separable cars according to claim 1 wherein two or more independent trolleys traveling together while joined together are referred to as a train;

wherein the track structure forms the path that guides the plurality of trolleys through the circuit formed by the track structure;

wherein the plurality of trolleys are joined into one or more trains as the plurality of trolleys travel through the track structure;

wherein each individual trolley is separated from the train as the individual trolley travels through the track structure such that each individual trolley can take an individual track path selected from the multipath structure of the track structure.

3. The multipath roller coaster with separable cars according to claim 2 wherein the track structure is a mechanical structure;

wherein the track structure forms a circuit over which the plurality of trolleys travel;

wherein the track structure is a multipath structure;

wherein by a multipath structure is meant that the track structure presents a plurality of routes over which each individual trolley selected from the plurality of trolleys can travel.

4. The multipath roller coaster with separable cars according to claim 3 wherein each of the plurality of trolleys is a vehicle;

wherein each of the plurality of trolleys attaches to the track structure such that the track structure guides the motion of each individual trolley along the path formed by the track structure;

wherein each of the plurality of trolleys carries one or more passengers along the path formed by the track structure;

wherein each of the plurality of trolleys travels along the path formed by the track structure in a manner selected from the group consisting of: a) traveling as a single individual trolley; and, b) traveling as part of a train of individual trolleys;

wherein each of the plurality of trolleys attaches to and detaches from the train as the individual trolley travels along the path formed by the track structure.

5. The multipath roller coaster with separable cars according to claim 4 wherein the control structure controls the path along which each individual trolley selected from the plurality of trolleys travels;

wherein the control structure enables each individual trolley selected from the plurality of trolleys such that the selected individual trolley can join a train;

wherein the control structure enables each individual trolley selected from the plurality of trolleys such that the selected individual trolley can detach from a train.

6. The multipath roller coaster with separable cars according to claim 5 wherein the track structure comprises a collection of individual track paths;

wherein track structure forms the physical structure that creates the circuit and the associated routes formed by the track structure;

wherein the track structure further presents a plurality of routes that are used by the plurality of trolleys to travel around the circuit formed by the track structure;

wherein each individual track path selected from the plurality of track paths is selected from the group consisting of: a) a primary track path; and, b) a peripheral track path;

wherein the primary track path refers to the elements of the plurality of track paths that form the base circuit structure of the track structure;

wherein the peripheral track path refers to one or more alternate paths that are formed around the primary track path;

wherein each peripheral track path forms a path with a starting point that branches off from the primary track path and a destination point that rejoins the primary track path;

wherein the peripheral track paths are separated from each other at a distance greater than twice the perimetrical boundary of any individual trolley to form clearances that ensure that the individual trolleys will not collide with each other;

wherein each individual track path describes a specific route that can be used by any individual trolley selected from the plurality of trolleys to travel around the circuit formed by the track structure;

wherein the individual track paths are interconnected to form the physical structures that create the circuit and the associated routes formed by the track structure.

7. The multipath roller coaster with separable cars according to claim 6 wherein the plurality of trolleys comprises a collection of individual trolleys;

wherein each individual trolley is identical;

wherein the individual trolley is a vehicle;

wherein each individual trolley selected from the plurality of trolleys is identical;

wherein the individual trolley attaches to the track structure such that the individual trolley travels along a path formed by the track structure;

wherein the control structure determines the route of the path followed by the individual trolley.

8. The multipath roller coaster with separable cars according to claim 7
wherein the control structure comprises a plurality of track switch structures
wherein each of the plurality of track switch structures is a mechanical device;
wherein the plurality of track switch structures determines which specific route each individual trolley takes as the individual trolley travels over the track structure.

9. The multipath roller coaster with separable cars according to claim 8
wherein each individual track switch controller is identical;
wherein the individual track switch controller is the mechanical structure that attaches the first individual track path to both the second and third individual track paths;
wherein the individual track switch controller is a mechanical structure, often called a switch, that selects the path of each individual trolley;
wherein by determining the path of the individual trolley is meant that the position of the mechanical structure of the individual track switch controller determines whether: a) the individual trolley travels from the first individual track path to the second individual track path; or, b) the individual trolley travels from the first individual track path to the third individual track path.

10. The multipath roller coaster with separable cars according to claim 9
wherein each individual track path comprises a port rail and a starboard rail;
wherein the port rail is a rail;
wherein the port rail forms a rigid structure that secures the individual trolley to the individual track path;
wherein the port rail forms the physical structure that guides the motion of the individual trolley through the track structure;
wherein the starboard rail is a rail;
wherein the starboard rail forms a rigid structure that secures the individual trolley to the individual track path;
wherein the starboard rail forms the physical structure that guides the motion of the individual trolley through the track structure.

11. The multipath roller coaster with separable cars according to claim 10
wherein each individual trolley selected from the plurality of trolleys comprises a chassis, a passenger compartment, a perimetrical boundary, and a primary sense of direction;
wherein the perimetrical boundary describes a hypothetical boundary that fully contains the physical structure of the individual trolley;
wherein the primary sense of direction is the intended direction of forward travel for each individual trolley selected from the plurality of trolleys;
wherein the chassis is a mechanical structure that attaches the individual trolley to the track structure;
wherein the chassis is a rolling structure that allows the individual trolley to roll along each individual track path selected from the plurality of track paths;
wherein the passenger compartment is a mechanical structure;
wherein the passenger compartment forms a protected space for the one or more passengers transported in the passenger compartment;
wherein the passenger compartment mounts on the chassis such that the position of the chassis is between the passenger compartment and the track structure.

12. The multipath roller coaster with separable cars according to claim 11
wherein the individual path switch selects the path taken by each individual trolley as the individual trolley travel across the individual path switch;
wherein by selecting the path is meant that the individual path switch selects the routing of each individual trolley from a course selected from the group consisting of: a) the individual trolley traveling from the first individual track path to the second individual track path; and, b) the individual trolley traveling from the first individual track path to the third individual track path;
wherein individual trolley such that the first individual trolley can detach from a train and travel independently over the track structure.

13. The multipath roller coaster with separable cars according to claim 12
wherein the control structure controls the specific individual track path along which the individual trolley travels;
wherein the specific individual track path selected from the plurality of track paths followed by each individual trolley selected from the plurality of trolleys determines when each individual trolley attaches to and detaches from a train.

14. The multipath roller coaster with separable cars according to claim 13
wherein the chassis further comprises a plurality of coaster wheels and a plurality of retaining wheels;
wherein each of the plurality of coaster wheels is a rotating structure known as a wheel;
wherein each of the plurality of coaster wheels allows the individual trolley to travel along a path formed by the track structure;
wherein each of the plurality of coaster wheels is a load bearing structure that transfers the bulk of the load of the individual trolley to the track structure;
wherein each of the plurality of coaster wheels transfers the load of the individual trolley to a rail of an individual track path selected from the group consisting of the port rail and the starboard rail;
wherein each of the plurality of retaining wheels is a rotating structure known as a wheel;
wherein each of the plurality of retaining wheels secures the individual trolley to a rail of an individual track path selected from the group consisting of the port rail and the starboard rail;
wherein each of the plurality of retaining wheels are positioned such that the plurality of retaining wheels are diametrically opposed to the plurality of coaster wheels relative to the selected rail;
wherein the plurality of retaining wheels and the plurality of coaster wheels are formed such that the plurality of retaining wheels and the plurality of coaster wheels combine to enclose the selected rail.

15. The multipath roller coaster with separable cars according to claim 14
wherein the plurality of coaster wheels comprises a plurality of port coaster wheels and a plurality of starboard coaster wheels;
wherein the plurality of port coaster wheels are the subset of coaster wheels selected from the plurality of coaster wheels that secure the individual trolley to the port rail of the individual track path;

wherein the plurality of starboard coaster wheels are the subset of coaster wheels selected from the plurality of coaster wheels that secure the individual trolley to the starboard rail of the individual track path;

wherein the plurality of retaining wheels comprises a plurality of port retaining wheels and a plurality of starboard retaining wheels;

wherein the plurality of port retaining wheels are the subset of retaining wheels selected from the plurality of retaining wheels that secure the individual trolley to the port rail of the individual track path;

wherein the plurality of starboard retaining wheels are the subset of retaining wheels selected from the plurality of retaining wheels that secure the individual trolley to the starboard rail of the individual track path.

16. The multipath roller coaster with separable cars according to claim 15
wherein the passenger compartment further comprises a bow electromagnet, a stern electromagnet, and a canopy;
wherein the bow electromagnet is an electrically powered magnet;
wherein the bow electromagnet attaches to the bow structure of the passenger compartment of the individual trolley;
wherein the stern electromagnet is an electrically powered magnet;
wherein the stern electromagnet attaches to the stern structure of the passenger compartment of the individual trolley;
wherein the polarity of the stern electromagnet is reversed relative to the polarity of the bow electromagnet;
wherein by reversing the polarity is meant that the bow electromagnet of any first individual trolley traveling along the track structure will be magnetically attracted to the stern electromagnet of any second individual trolley traveling track structure;
wherein the bow electromagnet of a first individual trolley magnetically attaches to the stern electromagnet of a second individual trolley to form a train.

17. The multipath roller coaster with separable cars according to claim 16 wherein the individual electromagnet control switch allows for the joining of individual track paths into trains by enabling the simultaneous operation of both bow electromagnet and the stern electromagnet of the passenger compartment of the individual trolley.

18. The multipath roller coaster with separable cars according to claim 17
wherein the canopy is a transparent structure that encloses the protected space formed by the passenger compartment;
wherein the canopy is a transparent structure that allows the passengers to see outside of the passenger compartment.

* * * * *